US009094730B1

(12) United States Patent
Kirmse et al.

(10) Patent No.: US 9,094,730 B1
(45) Date of Patent: Jul. 28, 2015

(54) PROVIDING TIMELY MEDIA RECOMMENDATIONS

(71) Applicant: Google Inc., Mountain View, CA (US)

(72) Inventors: Andrew Kirmse, Redwood City, CA (US); Yaroslav Volovich, Cambridge (GB); Ant Oztaskent, Sutton (GB); Jie Shao, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/309,374

(22) Filed: Jun. 19, 2014

(51) Int. Cl.
*H04N 21/482* (2011.01)
*H04N 21/25* (2011.01)

(52) U.S. Cl.
CPC ......... *H04N 21/4826* (2013.01); *H04N 21/251* (2013.01)

(58) Field of Classification Search
CPC .......... H04N 21/4104; H04N 21/4126; H04N 21/41407; H04N 21/4524; H04N 21/44227; H04N 21/466; H04N 21/4668
USPC ................................................ 725/46, 74, 85
See application file for complete search history.

(56) References Cited

U.S. PATENT DOCUMENTS

| 7,100,181 | B2 | 8/2006 | Srinivasan et al. | |
| 8,402,484 | B2* | 3/2013 | Belz et al. | 725/25 |
| 8,528,036 | B2 | 9/2013 | Davis et al. | |
| 2010/0205628 | A1* | 8/2010 | Davis et al. | 725/25 |
| 2011/0154399 | A1* | 6/2011 | Jin et al. | 725/46 |
| 2012/0060176 | A1* | 3/2012 | Chai et al. | 725/10 |
| 2012/0136721 | A1 | 5/2012 | Ullah | |
| 2012/0311038 | A1* | 12/2012 | Trinh et al. | 709/204 |
| 2014/0196069 | A1* | 7/2014 | Ahmed et al. | 725/14 |
| 2014/0223467 | A1* | 8/2014 | Hayton et al. | 725/18 |

* cited by examiner

*Primary Examiner* — John Schnurr
(74) *Attorney, Agent, or Firm* — Shumaker & Sieffert, P.A.

(57) ABSTRACT

A computing system is described that determines, based on a location history, a content-viewing location associated with a user of a mobile computing device and identifies a media output device located at the content-viewing location. Responsive to determining that the mobile computing device is located at the content-viewing location and in proximity to the media output device at a current time, the computing system determines, based on a plurality of features of the media output device, various media recommendations for the user at the current time. The plurality of features include an indication of whether the media output device is operating in an on state at the current time. The computing system outputs, for transmission to the mobile computing device, an indication of the various media recommendations.

20 Claims, 5 Drawing Sheets

PROVIDING TIMELY MEDIA RECOMMENDATIONS

BACKGROUND

Some media providers (e.g., television networks, video-on-demand (VOD) service providers, etc.) have developed ways to promote and entice potential viewers into using their services to view media content (e.g., television programming, VOD programming, etc.). For instance, a television network may send an e-mail to a viewer's e-mail account to alert that potential viewer of a recommended, upcoming television episode airing later in the week. Similarly, a VOD service provider may issue a monthly text-message to a subscriber's text message account to alert that subscriber to recently added/recommended media content that has been made available that month.

A user may view an e-mail, a text-message, or other type of notification associated with media content sporadically (e.g., at the time of receipt, during a lunch break, etc.) and not necessarily at the moment and/or location at which the user is most interested in viewing the media content. As such, these types of notifications, even if tailored to a user's specific viewing preferences and/or distributed when most people watch television (e.g., at "prime time"), may have limited effectiveness in motivating the user to interact with a media service and/or view the media content being promoted by the notification.

SUMMARY

In one example, the disclosure is directed to a method that includes determining, by a computing system, based on a location history associated with a user of a mobile computing device, a content-viewing location associated with the user, and identifying, by the computing system, a media output device located at the content-viewing location associated with the user of the mobile computing device. The method further includes, responsive to determining that the mobile computing device is located at the content-viewing location and in proximity to the media output device at a current time: determining, by the computing system, based on a plurality of features of the media output device, one or more media recommendations for the user at the current time, wherein the plurality of features include an indication of whether the media output device is operating in an on state at the current time, and outputting, by the computing system, for transmission to the mobile computing device, an indication of the one or more media recommendations.

In another example, the disclosure is directed to a computing system that includes at least one processor, and at least one module operable by the at least one processor to determine, based on a location history associated with a user of a mobile computing device, a content-viewing location associated with the user, and identify a media output device located at the content-viewing location associated with the user of the mobile computing device. The at least one module is further operable by the at least one processor to responsive to determining that the mobile computing device is located at the content-viewing location and in proximity to the media output device at a current time: determine, based on a plurality of features of the media output device, one or more media recommendations for the user at the current time, wherein the plurality of features include an indication of whether the media output device is operating in an on state at the current time and an indication of whether the media output device is outputting media content for display at the current time, and output, for transmission to the mobile computing device, an indication of the one or more media recommendations.

In another example, the disclosure is directed to an additional method that includes while located at a content-viewing location associated with a user and at a current time, outputting, by a mobile computing device, for transmission to a media output device located at the content-viewing location associated with the user, a device identifier associated with the mobile computing device. The method further includes responsive to outputting the device identifier associated with the mobile computing device, receiving, by the mobile computing device, from a computing system, an indication of one or more media recommendations for the user at the current time, wherein the one or more media recommendations are based on a plurality of features associated with the media output device, wherein the plurality of features include an indication of whether the media output device is operating in an on state at the current time and an indication of whether the media output device is outputting media content for display at the current time. The method further includes outputting, by the mobile computing device, for display, a graphical indication of the one or more media recommendations.

The details of one or more examples are set forth in the accompanying drawings and the description below. Other features, objects, and advantages of the disclosure will be apparent from the description and drawings, and from the claims.

DETAILED DESCRIPTION

Figure 1:
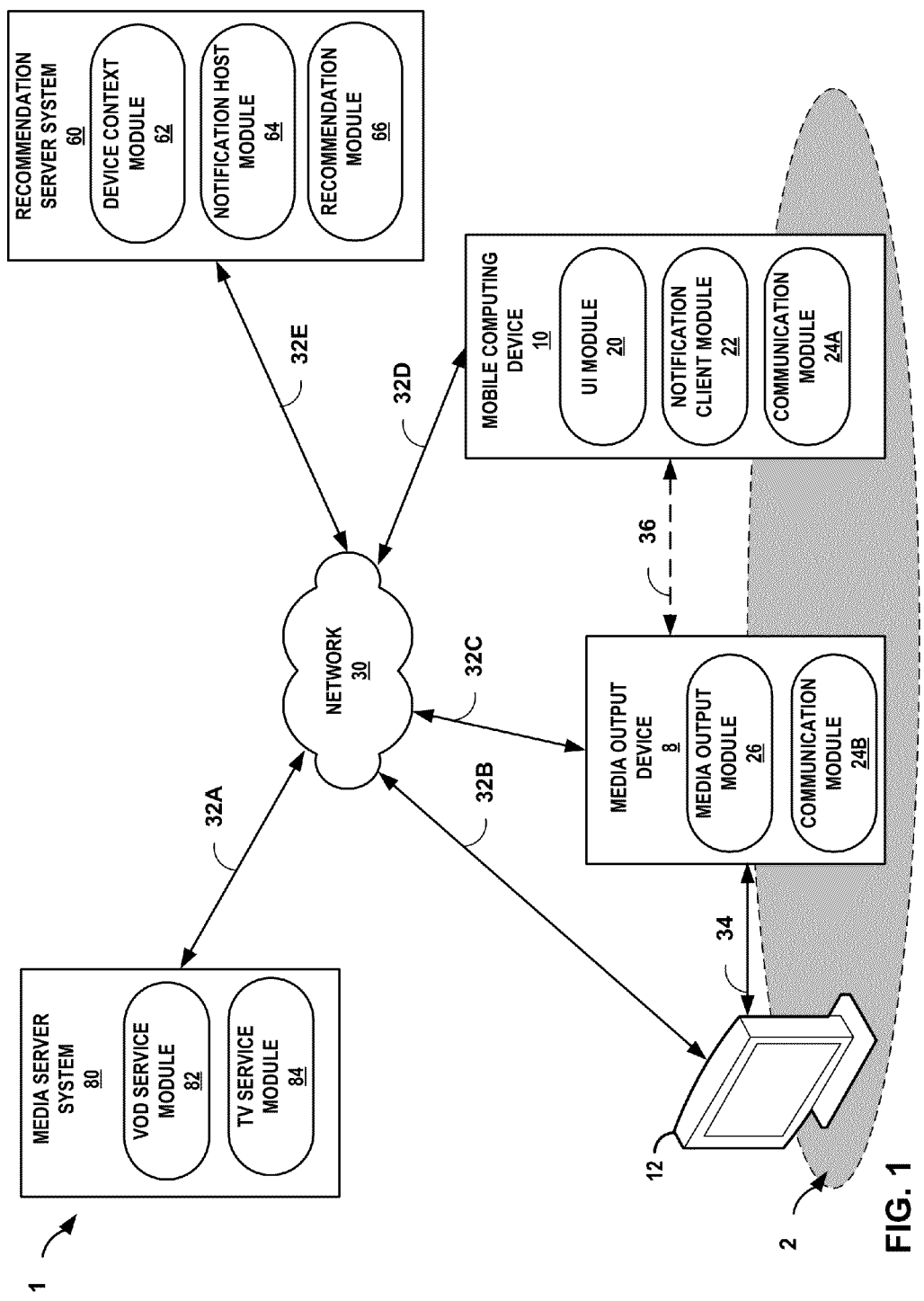
FIG. 1 is a conceptual diagram illustrating an example computing system configured to output one or more media recommendations to one or more example computing devices, in accordance with one or more aspects of the present disclosure.

In general, techniques of this disclosure may enable a computing system to automatically provide media recommendations to a user of a mobile computing device when the computing system determines that user is at a location where the media recommendations will likely be of interest to the user. For example, some users may have one or more preferred content-viewing location(s). That is, some users may prefer to view media content (e.g., television, video-on-demand (VOD), etc.) when in a certain room or area of their home, their office, a favorite bar/restaurant, etc. At each content-viewing location associated with the user, the user may view media content being displayed at a display device (e.g., a television, a projection screen, etc.). As such, recommendations for content received while a user is currently at a content-viewing location may prove particularly useful.

Some display devices may be configured to present "live television" media content as part of a live television broadcast provided by an over-the-air network or satellite/cable provider. In addition to live television broadcasts, some display devices may be operatively coupled to, or include, one or more "media output devices" (e.g., a set-top-box, a built-in application, a universal-serial-bus device, etc.) that provide access to, and present, VOD media content as part of a VOD service (e.g., a pay-per-view service, a digital video recording (DVR) service, an Internet channel or streaming media service, etc.). Some media output devices offer additional capabilities when paired with a mobile computing device (e.g. mobile phone, tablet computer, laptop computer, etc.). For example, when paired with a mobile phone, some media output devices can be controlled according to inputs (e.g., gestures) detected at a screen of the mobile phone. In addition, some media output devices can "mirror" graphical content received from a mobile computing device by presenting the graphical content at an external display device (e.g., a television) as if the graphical content were being presented at the screen of the mobile phone.

In any event, a media output device located at a content-viewing location of a user may exchange information with that user's mobile computing device when the user is in proximity to the media output device. Based on information obtained from a media output device, a computing system according to the techniques of this disclosure may infer, predict, or otherwise determine whether or not a user is likely located at one of his or her content-viewing locations. In response to determining that the user is at a content-viewing location, the computing system may automatically (e.g., without user intervention) output, to the mobile computing device, media recommendations based on additional information obtained from the media output device, such as information indicating whether or not the user is currently viewing media content and, if so, what type of media content (e.g., live television, VOD, etc.) that he or she is likely watching or may be interested in watching. The user may view the media recommendations from the mobile computing device (e.g., as graphical content displayed as part of a user interface).

In this manner, the computing system may present media recommendations to a user of a mobile computing device at a time and location at which the user is likely to be interested in watching media content. As such, by providing timely media recommendations when the user is likely to be interested in watching a television broadcast or a VOD service, the media recommendations may have a better chance at gaining the user's attention and the media content specified by the media recommendations may have a better chance of being watched.

Throughout the disclosure, examples are described where a computing device and/or a computing system may analyze information (e.g., locations, speeds, etc.) associated with a computing device only if the computing device receives permission from the user to analyze the information. For example, in situations discussed below in which the computing device may collect or may make use of information associated with the user, the user may be provided with an opportunity to provide input to control whether programs or features of the computing device can collect and make use of user information (e.g., information about a user's current location, current speed, etc.), or to dictate whether and/or how the computing device may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device.

Figure 2:
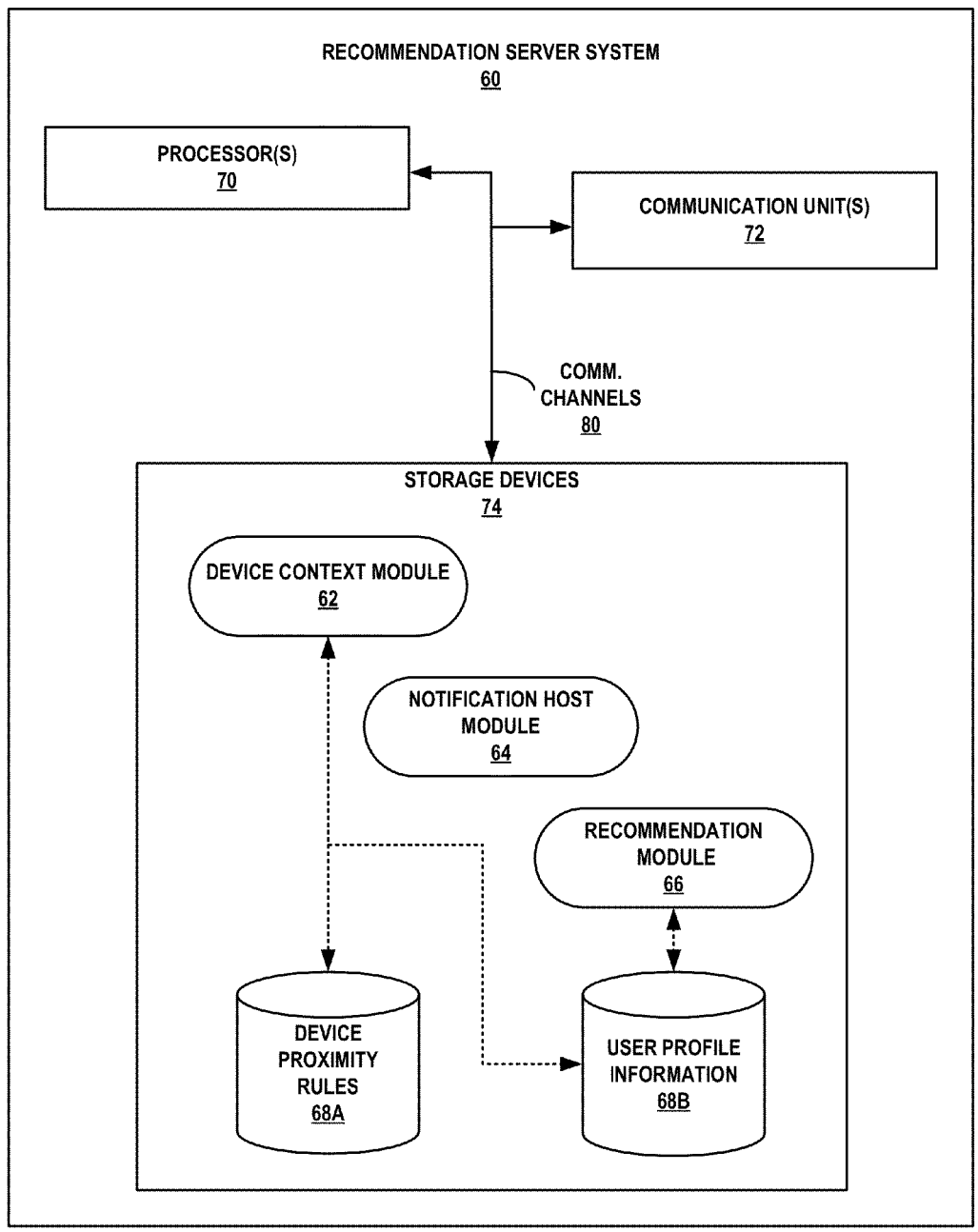
FIG. 2 is a block diagram illustrating an example computing configured to output one or more media recommendations, in accordance with one or more aspects of the present disclosure.

FIG. 1 is a conceptual diagram illustrating an example computing system 1 configured to output one or more media recommendations to example mobile computing device 10, in accordance with one or more aspects of the present disclosure. Computing system 1 of FIG. 1 is an example computing system that includes media output device 8, mobile computing device 10, display device 12, recommendation server system 60, media server system 80, and network 30. Media output device 8, mobile computing device 10, and display device 12 are illustrated as being at the same content-viewing location 2. In other words, FIG. 2 illustrates devices 8, 10, and 12 each being collocated within a threshold physical distance of the other and at content-viewing location 2.

As used herein, the term "content-viewing location" is used to describe any location that is more likely than not to be a preferred place at which a user of a computing device enjoys viewing media content. For example, a content-viewing location may be a specific room in a person's home where he or she frequently watches movies or television. A content-viewing location may be a public bar/restaurant at which he or she enjoys watching sporting events. A content viewing-location may be a specific work location, office, or meeting room where the user watches media content.

Network 30 represents a combination of any one or more public or private communication networks, for instance, television broadcast networks, cable or satellite networks, cellular networks, Wi-Fi networks, broadband networks, and/or other type of network for transmitting data (e.g., telecommunications and/or media data) between computing devices, systems, and other communications and media equipment. Media output device 8, mobile computing device 10, display device 12, recommendation server system 60, and media server system 80 may each send and receive data across network 30 using any suitable communication techniques. For example, media server system 80 may be operatively coupled to network 30 using network link 32A, and display device 12 may be operatively coupled to network 30 using network link 32B. Media output device 8 may be operatively coupled to network 30 via network link 32C, mobile computing device 10 may be operatively coupled to network 30 via network link 32D, and recommendation server system 60 may be operatively coupled to network 30 by network link 32E. Network 30 may include network hubs, network switches, network routers, etc., that are operatively intercoupled thereby providing for the exchange of information between media output device 8, mobile computing device 10, display device 12, recommendation server system 60, and media server system 80. In some examples, network links 32A-32E (collectively, "network links 32") may be Ethernet, ATM or other network connections. Such connections may be wireless and/or wired connections.

FIG. 1 shows direct links 34 and 36 between, respectively, display device 12 and media output device 8, and media output device 8 and mobile computing device 10. Each of direct links 34 and 36 represent direct or local paths or connections shared between devices 12 and 8 and 8 and 10 to facilitate the exchange of information between devices 8, 10, and 12 independent of any communication channels shared between devices 8, 10, and 12 as part of network 30. In other words, although devices 8, 10, and 12, may be operatively coupled to each other via network 30, links 34 and 36 represent direct links shared between two of devices 8, 10, and 12 that are separate from network 30.

Media server system 80 represents any suitable remote computing system, such as one or more desktop computers, laptop computers, mainframes, servers, cloud computing systems, etc. capable of transmitting media content (e.g., live television content, VOD content, etc.) across network link 32A to network 30. In some examples, media server system 80 represents a media provider's host server for distributing media content to one or display devices associated with one or more viewers and/or subscribers scattered across a wide range of physical locations. For example, display device 12 may receive media content via network 30 from media server system 80. A user of display device 12 may view the media content provided by media server system 80, for instance, as a live television broadcast being presented at a screen of display device 12.

Media output device, mobile computing device 10, and/or recommendation server system 60 may access media content and related data (e.g., programming schedules, meta data, user profile information, etc.) and use that information for providing media recommendations to a user of mobile computing device 10. In some examples, media server system 80 represents a cloud computing system that provides access to media content through network 30 to one or more of media output device 8, display device 12, mobile computing device 10, recommendation server system 80, and/or any other device or system which is configured to utilizes media content and related information provided by media server system 80.

In the example of FIG. 1, media server system 80 includes video-on-demand (VOD) service module 82 and television (TV) service module 84. Modules 82 and 84 may perform operations described using software, hardware, firmware, or a mixture of hardware, software, and firmware residing in and/or executing at media server system 80. Media server system 80 may execute modules 82 and 84 with multiple processors or multiple devices. Media server system 80 may execute modules 82 and 84 as virtual machines executing on underlying hardware. Modules 82 and 84 may execute as one or more services of an operating system or computing platform. Modules 82 and 84 may execute as one or more executable programs at an application layer of a computing platform.

VOD service module 82 and TV service module 84 may each perform functions for hosting, respectively, a VOD service and a television (e.g., over-the-air, cable, satellite, etc.) service and providing media content associated with the services, via network 30 to subscribers of the respective services (e.g., mobile computing device 10, media output device 8, etc.). For example, VOD service module 82 may host a streaming VOD service from which a user of media output device 8 can access, on-demand, movies, television shows, and other types of media content. VOD service module 82 may transmit media content associated with the VOD service across links 32A and 32C. Media output device 8 may format and present graphical images associated with the received media content at display device 12. TV service module 84 may host a television broadcasting service (e.g., one or more television channels) from which a user of display device 12 can access media content based on a live television broadcast. TV service module 84 may transmit media content associated with the live television broadcast across links 32A and 32B. Display device 12 may format and present graphical images associated with the received media content.

Display device 12 represents any suitable output device for presenting media content received from media server system, such as media server system 80, associated with a television and/or VOD service provider. For example, display device 12 may be a television, a computer monitor, a projector screen, or other type of display. Display device 12 may function as an output (e.g., display) device using one more display devices, such as a liquid crystal display (LCD), a dot matrix display, a light emitting diode (LED) display, an organic light-emitting diode (OLED) display, an e-ink, or a similar monochrome or color display capable of outputting visible information to a user of display device 12. Display device 12 may present output to a user, for instance at a presence-sensitive display. Display device 12 may present the output as a graphical user interface, which may be associated with functionality provided by media server system 80 and/or media output device 8. For example, display device 12 may present various user interfaces related to the functionality of computing platforms, operating systems, applications, and/or services executing at or accessible by media output device 8 (e.g., electronic message applications, Internet browser applications, mobile operating systems, etc.). A user may interact with a user interface to cause media output device 8 to perform operations relating to functions that are visible as media content being displayed at display device 12.

Media output device 8 may comprise at least one processor and at least one module operable by the at least one processor to receive media content from a VOD service provider (e.g., VOD service module 82 of media server system 80) and/or a mobile computing device (e.g., mobile computing device 10), format, and output the media content, for display, at display device 12. For example, media output device may receive media content being transmitted by VOD service module across links 32A and 32C. Media output device 8 may format and present graphical images associated with the media content received from VOD service module 82 at display device 12. Media output device 8 may receive media content being transmitted by mobile computing device 10 across direct link 26 and may likewise format and present graphical images associated with the media content received from mobile computing device 10 at display device 12.

As used herein, a media output device, such as media output device 8, may be operating in an on-state (e.g., a state in which the device is capable of outputting media content for display) or an off-state (e.g., a state in which the devices is not capable of outputting media content for display). In other words, while in an on-state, the media output device may respond to a full set of commands or controls received from a mobile computing device (e.g., computing device 10) and based on those commands or controls, output, or refrain from outputting, media content for display. While in an off-state, the media output device may operate in a "stand-by" or "sleep" state and only respond to a limited set of commands or controls, for instance, to provide location information or to cause the media output device "wake-up" and transition to the on-state.

Media output device 8 comprises media output module 26 and communication module 24B. Modules 26 and 24B may perform operations described using software, hardware, firmware, or a mixture of hardware, software, and firmware residing in and/or executing at media server system 80. Media output device 8 may execute modules 26 and 24B with multiple processors or multiple devices. Media server system 80 may execute modules 26 and 24B as virtual machines executing on underlying hardware. Modules 26 and 24B may execute as one or more services of an operating system or computing platform. Modules 26 and 24B may execute as one or more executable programs at an application layer of a computing platform.

Media output module 26 may communicate with a media server system, such as media server system 8, process media content received from the media server system, and output the received media content for display at display device 12. For example, media output module 26 may receive streaming video via network 30 from VOD service module 82. Media output module 26 may format and optimize the streaming video for display as graphical content at display device 12. Media output module 26 may transmit the formatted graphical content to display device 12 via direct link 34 (e.g., an HDMI cable) and display device 12 may output the graphical content at a screen of display device 12.

Media output module 26 may provide a graphical user interface for display at display device 12 from which a user may interact with media output device 8 in order to select and otherwise control the media content being displayed at display device 12. For example, a user may interact with a menu interface that media output module 26 outputs for display at display device 12. The user may provide input to a remote control that is operatively coupled with media output device 8. Based on the input detected at the remote control, media output module 26 may start, stop, pause, fast forward, rewind, or otherwise alter the media content being displayed at display device 12.

Communication module 24B of media output device 8 may establish one or more communications sessions for exchanging data with various external computing devices that are in proximity to media output device 8. For example, communication module 24B may perform handshaking between respective Bluetooth transceivers of media output device 8 and mobile computing device 10 to provide a way for mobile computing device 10 to share media content to be displayed by media output device 8 at display device 12. Communication module 24B may allow media output device 8 to exchange information via any number of communication protocols, including but not limited to Bluetooth, Wi-Fi, Ethernet, Near-Field-Communication protocol (NFC), Radio Frequency Identifier (RFID), and the like.

In establishing a communication session with an external computing device, such as mobile computing device 10, media output device 8 may obtain various types of information from the external computing device which identifies the external computing device and/or media content being shared by the external computing device. For example, after establishing a Bluetooth session with mobile computing device 10, communication module 24B may obtain a Bluetooth identifier that specifies a name associated with mobile computing device 10. The name obtained from the Bluetooth identifier may be unique to mobile computing device 10 and when shared with other computing systems, such as recommendation server system 60, the other computing systems may be able to identify a particular user (e.g., a person) associated with mobile computing device 10.

In addition to communicating via network 30 with a media server system, such as media server system 80, media output device 8 may communicate via network 30 with other types of remote computing systems to provide status information to the remote computing systems that indicates the operating status associated with media output device 8 and the media content being output for display by media output device 8. For example, communication module 24B of media output device 8 may transmit one or more indications (e.g., data) that indicates the operating state of media output device 8 at a particular time (whether media output device 8 is operating in an on state, an off state, outputting media content for display, refraining from outputting media content for display, etc.).

Communication module 24B of media output device 8 may provide an indication (e.g., data) of whether media output device 8 is operating in an on state (e.g., while powered on) or an off state (e.g., while drawing limited power) at a current time, and an indication of whether media output device 8 is outputting media content for display at display device 12 at a current time, information indicating which one or more video-on-demand services that are associated with media content being output for display by media output device 8, information indicating a particular video-on-demand service from one or more video-on-demand services that is associated with media content being output for display by media output device 8, metadata associated with media content being output for display be media output device 8, etc.

Communication module 24B may provide an indication of a signal strength of a signal (e.g., a quantity of decibel-millivolts per meter, a quantity of decibel-microvolts per meter, etc.) received by media output device 8 from a mobile computing device, such as mobile computing device 10, during a communication session between media output device 8 and the mobile computing device. For instance, media output device 8 may send data via network 30 to recommendation server system 60 indicating that a strong communication signal (e.g., greater than a signal strength threshold) or a weak communication signal (e.g., less than a signal strength threshold) is being received from mobile computing device 10. The signal strength may change based on physical distance between media output device 8 and the mobile computing device. For instance, when media output device 8 is in proximity to (e.g., within a distance threshold, for instance ten meters) the mobile computing device, the signal strength may be high and may exceed a signal strength threshold. When media output device 8 is not in proximity to (e.g., not within a distance threshold, for instance ten meters) the mobile computing device, the signal strength may be low and may not exceed a signal strength threshold.

In the example of FIG. 1, mobile computing device 10 (sometimes referred to simply as "computing device 10") is a single mobile phone, however in other examples, mobile computing device 10 may be any combination of one or more tablet computers, mobile phones, personal digital assistants (PDA), desktop computers, laptop computers, gaming systems, media players, e-book readers, television platforms, automobile navigation systems, wearable computing device (e.g., a computerized watch, computerized eyewear, computerized gloves, etc.), or any other types of mobile and/or non-mobile computing devices that have at least one processor and at least one module that is configured to communicate (e.g., transmit and receive data) across a network, such as network 30, and with a media output device, such as media output device 8 via a direct link, such as direct link 36.

Mobile computing device 10 may include user interface ("UI") module 20, notification client module 22, and communication module 24A. Modules 20, 22, and 24A may perform operations described using hardware, software, firmware, or a mixture of hardware, software, and firmware residing in and/or executing at computing device 10. Computing device 10 may execute modules 20, 22, and 24A with one or more processors. Computing device 10 may execute modules 20, 22, and 24A as one or more virtual machines executing on underlying hardware of computing device 10. Modules 20, 22, and 24A may execute as one or more services or components of operating systems or computing platforms of computing device 10. Modules 20, 22, and 24A may execute as one or more executable programs at application layers of computing platforms of computing device 10. Modules 20, 22, and 24A may be otherwise arranged remotely to and remotely accessible by computing device 10, for instance, as one or more network services operating at network 30 in a network cloud.

UI module 20 may cause mobile computing device 10 to output a user interface (e.g., a graphical user interface) for display at screen or other display device that is operatively coupled to computing device 10. As a user of mobile computing device 10 views, hears, feels, or otherwise detects output generated as part of the user interface managed by UI module 20, UI module 20 may receive one or more indications of input from the user as the user interacts with the user interface. UI module 20 may interpret inputs detected at mobile computing device 10 (e.g., as a user provides one or more gestures at one or more locations of a screen at which a user interfaces is displayed) and may relay information about the inputs detected at the screen to one or more associated platforms, operating systems, applications, and/or services executing at mobile computing device 10, to cause mobile computing device 10 to perform functions.

For instance, while at a content-viewing location associate with a user (e.g., content-viewing location 2), and while in proximity to media output device 8, a user of mobile computing device 10 may interact with the user interface of mobile computing device 10 by providing input at mobile computing device 10 to control media output device 8 and to cause media output device 8 to present media content from a VOD service and/or to present graphical content based on media content received from mobile computing device 10. UI module 20 may receive indications of the control input and in processing the control input, send data associated with the control input to communication module 24A for transmission to communication module 24B of media output device 8. Media output device 8 may respond to the control input received by communication module 24B to alter the presentation of media content that media output device presents at display device 12.

UI module 20 may receive information and instructions from one or more associated platforms, operating systems, applications, and/or services executing at mobile computing device 10 (e.g., notification module 22, etc.) for generating a user interfaces. In addition, UI module 20 may act as an intermediary between the one or more associated platforms, operating systems, applications, and/or services executing at computing device 10 and various output devices of computing device 10 (e.g., speakers, LED indicators, audio or electrostatic haptic output device, etc.) to produce output (e.g., a graphic, a flash of light, a sound, a haptic response, etc.) with computing device 10. For example, UI module 20 may receive information from notification client module 22 that causes UI module 20 to output, for display, a graphical indication of a notification received via network 30.

Notification client module 22 may perform functions associated with receiving, managing, and otherwise handling notification data being generated and/or received by platforms, applications, and services executing at mobile computing device 10. Notification client module 22 may cause UI modules 20 to output alerts (e.g., an audible alert, a visual alert, a vibration, etc.) to indicate the receipt of notification data by computing device 10. Notification client module 22 may cause UI module 20 to output, for display at a screen, a notification center graphical user interface from which a user of mobile computing device 10 can view, delete, or otherwise interact with notifications received by computing device 10.

Notification client module 22 may receive notification data from notification host module 64 of recommendation server system 60 and output the received notification data to a recipient platform, application, and/or service executing at computing devices 10. Notification client module 22 may receive notification data generated by a respective platform, application, and/or service executing at computing devices 10, and output the received notification data via network 30 to recommendation server system 60.

As used throughout the disclosure, the term "notification data" is used to describe various types of information that may indicate the occurrence of an event associated with various platforms, applications, and services executing within an execution environment at one or more computing devices, such as computing devices 10. For example, notification data may include, but is not limited to, information specifying an event such as: the receipt of a communication message (e.g., e-mail, instant message, SMS, etc.) by a messaging account associated with a user of computing devices 10, the receipt of information by a social networking account associated with a user of computing devices 10, a reminder of a calendar event (meetings, appointments, etc.) associated with a calendar account of a user of computing devices 10, information generated and/or received by a third-party application executing at computing devices 10, the transmittal and/or receipt of inter-component communications between two or more components of platforms, applications, and/or services executing at computing devices 10, etc.

In some examples, notification data may represent a pointer to a location in memory of information associated with the occurrence of an event. For example, notification data may comprise a pointer to a location of a message identifier a message inbox (e.g., associated with an e-mail account) stored in a memory. In some examples, notification data may represent the information associated with the occurrence of the event. For example, notification data may comprise the text or content of a message received at a message inbox (e.g., associated with an e-mail account) stored in a memory.

Communication module 24A of mobile computing device 10 may establish one or more communications sessions for transferring information between mobile computing device 10 and various external computing devices that are in proximity to computing device 10. For example, communication module 24A may perform handshaking between respective Bluetooth transceivers of media output device 8 and mobile computing device 10 to provide a way for mobile computing device 10 to share media content to be displayed by media output device 8 at display device 12. Communication module 24A may allow mobile computing device 10 to exchange information via any number of communication protocols, including but not limited to Bluetooth, Wi-Fi, Ethernet, Near-Field-Communication protocol (NFC), Radio Frequency Identifier (RFID), and the like. Communication module 24A may communicate directly via direct link 36 with communication module 24B of media output device 8 to exchange media content and control signals for controlling the presentation of media content as media output device 8 presents the media content at display device 12.

Recommendation server system 60 may process and analyze information obtained via network 30 from media output device 8, mobile computing device 10, and/or media server system 80 to provide one or more media recommendations to a user of computing device 10. Recommendation server system 60 may automatically provide media recommendations to a user of mobile computing device 10, when recommendation server system 60 determines that media recommendations will be of the most interest to the user.

Recommendation server system 60 includes notification host module 64, device context module 62, and recommendation module 66. Recommendation server system 60 represents any suitable remote computing system, such as one or more desktop computers, laptop computers, mainframes, servers, cloud computing systems, etc. capable of transmitting notifications and/or indications (e.g., network data) specifying one or more media recommendations of media content, across network link 32E to network 30. For example, recommendation server system 60 may infer, predict, or otherwise determine when a user of mobile computing device 10 is located at a content-viewing location associated with the user (e.g., content-viewing location 2) and in proximity to media output device 8, and in response to the determination, provide timely media recommendations of one or more television programs, VOD programs, or other media content services and/or media content channels that the user may enjoy.

Modules 62, 64, and 66 may perform operations described using software, hardware, firmware, or a mixture of hardware, software, and firmware residing in and/or executing at media server system 80. Recommendation server system 60 may execute modules 62, 64, and 66 with multiple processors or multiple devices. Media server system 80 may execute modules 62, 64, and 66 as virtual machines executing on underlying hardware. Modules 62, 64, and 66 may execute as one or more services of an operating system or computing platform. Modules 62, 64, and 66 may execute as one or more executable programs at an application layer of a computing platform.

Notification host module 64 may perform functions for routing notification data between computing device 10 and other computing devices over network 30. Notification host module 64 may perform functions for hosting a notification service and also, functions for outputting notification data for transmission to computing device 10 and other computing devices over network 30. For example, notification host module 64 may receive notification data that indicates a message was received by an instant messaging account associated with computing device 10 and may output the notification data for transmission across network 30 to computing devices 10.

Notification client module 22 of computing device 10 may receive notification data from notification host module 64 and cause computing devices 10 to output alerts based on notification data received from notification host module 64 to indicate the receipt of the notification data by computing devices 10. For example, notification client module 22 may receive notification data comprising an indication of one or more media recommendations provided by recommendation server system 60 and output a graphical alert indicative of the media content being referenced within the one or more media recommendations.

Device context module 62 may perform operations for determining a context associated with a user of computing device 10. Device context module 62 may process and analyze contextual information (e.g., respective locations, direction, speed, velocity, orientation, etc.) associated with computing device 10 and media output device 8, and based on the contextual information, define a context specifying the state or physical operating environment of computing device 10 and media output device 8. In other words, device context module 62 may process contextual information received from computing device 10 and/or media output device 8 and use the contextual information to generate a context of the user of computing device 10 that specifies one or more characteristics associated with the user of computing device 10 and his or her physical surroundings at a particular time (e.g., location, name, address, and/or type of place, building, etc., weather conditions, traffic conditions, calendar information, meeting information, event information, etc.). For example, device context module 62 may determine respective physical locations associated with each of media output device 8 and computing device 10 and update the respective physical locations as device context module 62 detects respective movement, if any, associated with each of output device 8 and computing device 10 over time.

Device context module 62 may determine when computing device 10 is in proximity to media output device 8 (e.g., when respective locations of devices 8 and 10 are within a distance threshold of one or more meters) and the user of computing device 10 is currently at a content-viewing location ((e.g., content-viewing location 2, for instance, a room or area of a house, office, building, bar/restaurant, or other location at which the user views media content) to determine whether or not to provide media recommendations to the user at a particular time. In some examples, device context module 62 may determine a context associated with a user of computing device 10 (e.g., specifying a location, a time, an event, an activity, etc.) based on contextual information received from media output device 8 over network 30. For example, device context module 62 may determine that a user of computing device 10 is viewing media being output for display by media output device 8 when device context module 62 receives an indication from media output device 8 that computing device 10 and media output device 8 are in a short range communication session (e.g., Bluetooth). For instance, device context module 62 may determine a device identifier (e.g., a user name, a phone number, etc.) associated with one or more short range wireless communication signals received by media output device 8 and perform a lookup of the device identifier within profile information associated with the user of computing device 10 to determine whether media output device 8 and computing device 10 are exchanging data.

In some examples, device context module 62 may determine a context of a user of computing device 10 based on communication information received by computing device 10 and/or recommendation server system 60 associated with the user of computing device 10. For example, recommendation server system 60 may have access to communications or other profile information associated with the user of computing device 10 (e.g., stored calendars, phone books, message accounts, e-mail accounts, social media network accounts, and the like) and analyze the communication information for information pertaining to a user's current location. For example, device context module 62 may analyze an electronic calendar associated with the user of computing device 10 that indicates when the user will be home, at work, at a friend's house, etc. and infer, based on the calendar information, that the user of computing device 10 is at the location specified by the calendar information at the time specified by the calendar information.

Device context module 62 may maintain a location history associated with the user of computing device 10. For example, device context module 62 may periodically update a location of computing device 10 and store the location along with a day and time information in a database (e.g., a data store) and share the location information with recommendation module 66 to predict, infer, or confirm when a user of computing device 10 is likely at a content-viewing location at a future time. Device context module 62 may maintain a location history associated with computing device 10 and media output device 8 and correlate the location histories to determine when devices 8 and 10 are at the same location.

As used throughout the disclosure, the term "contextual information" is used to describe information that can be used by a computing system and/or computing device, such as recommendation server system 60 and computing device 10, to determine one or more environmental characteristics associated with computing devices and/or users of computing devices, such as past, current, and future physical locations, degrees of movement, weather conditions, traffic conditions, patterns of travel, and the like. In some examples, contextual information may include sensor information obtained by one or more sensors (e.g., gyroscopes, accelerometers, proximity sensors, etc.) of media output device 8 and computing device 10, radio transmission information obtained from one or more communication units and/or radios (e.g., global positioning system (GPS), cellular, Wi-Fi, etc.) of media output device 8 and computing device 10, information obtained by one or more input devices (e.g., cameras, microphones, keyboards, touchpads, mice, etc.) of media output device 8 and computing device 10, and network/device identifier information (e.g., a network name, a device internet protocol address, etc.).

Recommendation module 66 may cause notification host module 64 to generate and automatically provide one or more media recommendations to mobile computing device 10, when recommendation module 66 determines that media recommendations will be of the most interest to a user of mobile computing device 10. For example, recommendation module 66 may maintain one or more rules (e.g., as part of a machine learning algorithm) for determining whether a user of computing device 10 is at a content-viewing location associated with the user, and possibly, also viewing media content at the content-viewing location. Recommendation module 66 may receive as input from device context module 62, information specifying a respective context of devices 8 and 10. Recommendation module 66 may further obtain other information from devices 8 and 10, such as, an indication of whether device 8 is operating in an on state, an indication of whether media output device 8 is outputting media content for display, etc.

Recommendation module 66 may feed the information obtained from device context module 62 and devices 8 and 10, into the one or more rules for discerning whether a user of computing device 10 is at a content-viewing location and in proximity to media output device 8. Recommendation module 66 may receive as output from the one or more rules, a probability or degree of likelihood indicating whether the user of computing device is viewing media content being output for display at a content-viewing location located in proximity to media output device 8.

Recommendation module 66 may determine whether the probability or degree of likelihood satisfies a probability threshold for indicating that the user is viewing media content. If the probability or degree of likelihood satisfies the threshold (e.g., greater than fifty percent likelihood, etc.) recommendation module 66 may determine that the user is viewing media content and as such, provide one or more media recommendations to the user.

Recommendation module 66 may query media server system 80 for information regarding programming schedules, and media content descriptions associated with the media content offered by VOD service module 82 and/or TV service module 84. Recommendation module 66 may analyze the programming schedules, and media content descriptions associated with the media content offered by VOD service module 82 and/or TV service module 84 and determine one or more television broadcasts, VOD shows, television channels, or VOD services to recommend to the user. For example, recommendation module 66 may maintain a viewing, or interest graph, profile of the user of computing device 10 and cross correlate the profile with the different channels, shows, and services being offered by media service system 80 at the current time to determine one or more media recommendations to provide to the user at the current time.

Recommendation module 66 may output an indication of the one or more media recommendations to notification host module 64 and cause notification host module 64 to transmit a notification of the one or more recommendations via network 30 to computing device 10. Notification client module 22 may receive the notification of the one or more media recommendations and cause UI module 20 to output information based on the one or more media recommendations within a graphical indication or element (e.g., a popup window, etc.) of a user interface.

In accordance with the techniques of this disclosure, recommendation server system 60 may determine, based on a location history associated with a user of mobile computing device 10, a content-viewing location associated with the user. For example, device context module 62 may infer a home location of a user of mobile computing device 10 corresponding to content-viewing location 2, based on a repeated occurrence of a location of a residential address appearing in a location history of the user during a particular period time of day. Device context module 62 may determine that, based on a location history of media output device 8, that media output device 8 is most often located at the home location of the user (e.g., content-viewing location 2).

Recommendation server system 60 may identify media output device 8 as being a media output device located at the content-viewing location associated with the user of mobile computing device 10. A machine learning system of recommendation module 66 may determine that media output device 8 outputs media content for display whenever computing device 10 and media output device 8 are at the same location and as a result, determine that the home location of the user is also a location at which the user often views media content (e.g., watches television, etc.). Recommendation module 66 may infer that the home location of the user is also a content-viewing location of the user since media output device 8 (e.g., a device which outputs media content for display) is located at the home location of the user.

Responsive to determining that mobile computing device 10 is located at the content-viewing location and in proximity to media output device 8 at a current time, recommendation server system 60 may determine, based on a plurality of features of media output device 8, one or more media recommendations for the user at the current time. The plurality of features may include an indication of whether media output device 8 is operating in an on state at the current time and an indication of whether media output device 8 is outputting media content for display at the current time.

For example, recommendation module 66 may determine that a context of computing device 10 and a context of media output device 8 indicate that the two devices 8 and 10 are within a threshold distance of each other (e.g., at the same street address, same block, etc.). Recommendation module 66 may communicate with media output device 8 and obtain information indicating whether media output device 8 is operating in an on state at a current time, an indication of whether media output device 8 is outputting media content for display at a current time, an indication of the type of media content being output by media output device 8 at the current time, etc. Recommendation module 66 may receive an indication of a strength of a signal (e.g., a Bluetooth signal) received by media output device 8 from computing device 10.

Recommendation module 66 may input the information obtained from media output device 8 into one or more rules for determining whether a user of computing device 10, when proximate to media output device 8, is likely viewing media content. For example, recommendation module 66 may determine that the likelihood that the user is viewing media content exceeds a probability threshold when strength of a signal (e.g., a Bluetooth signal) being communicated between computing device 10 and media output device 8 is high (e.g., greater than a decibel per meter threshold).

After determining that the user of computing device 10 is likely viewing media content at the current time, media recommendation module 66 may ascertain one or more media recommendations for the user. For example, if recommendation module 66 receives information from media output device 8 indicating a particular VOD services being accessed by media output device 8 at a current time, recommendation module 66 may determine one or more programs available from the particular VOD service that match a user profile maintained by recommendation module 66.

If recommendation module 66 receives information from media output device 8 indicating that media output device is not outputting any media content fro at the current time, recommendation module 66 may determine one or more programs available from a television service (e.g., not a VOD service) that match a user profile maintained by recommendation module 66 as one or more media recommendations. If recommendation module 66 receives information from media output device 8 indicating that media output device is not operating in an on-state, rather media output device 8 is operating in an off-state, at the current time, recommendation module 66 may indiscriminately determine one or more programs available from both television services and VOD services that match a user profile maintained by recommendation module 66. In some examples, if recommendation module 66 receives information indication media output device 8 is operating in an off-state, recommendation module 66 may determine that no media recommendations are suitable for presentation to the user at the current time.

In any event, recommendation module 66 may cause notification host module 64 to output an indication (e.g., notification data) to mobile computing device 10 that includes information specifying the one or more media recommendations determined at the current time. Notification client module 22 may cause UI module 20 to present the notification data as a graphical, audible, or haptic type alert to indicate to the user that the one or more media recommendations were received.

In this way, recommendation server system 60 may provide one or more media recommendations to the user of mobile computing device 10 when the user is likely viewing media content. By providing media recommendations at a time when the user is more likely watching a television broadcast or a VOD service, the user of computing device 10 may perceive the recommendations as being useful rather than an annoyance. Useful media recommendations provided by recommendation server system 60 may have a better chance at gaining the attention of the user of computing device 10 and as a result, the media content specified by the media recommendations may have a better chance at being viewed.

FIG. 2 is a block diagram illustrating recommendation server system 60 as one example computing system configured to output one or more media recommendations, in accordance with one or more aspects of the present disclosure. Recommendation server system 60 is described below within the context of system 1 of FIG. 1. FIG. 2 illustrates only one particular example of recommendation server system 60, and many other examples of recommendation server system 60 may be used in other instances and may include a subset of the components included in example recommendation server system 60 or may include additional components not shown in FIG. 2.

As shown in the example of FIG. 2, recommendation server system 60 includes one or more processors 70, one or more communication units 72, and one or more storage devices 74. Storage devices 74 of recommendation server system 60 include device context module 62, notification host module 64, and recommendation module 66. Storage devices 74 of recommendation server system 60 further include device proximity rules data store 68A, and user profile information data store 68B (collectively, "data stores 68"). Communication channels 76 may interconnect each of the components 70, 72, and 74 for inter-component communications (physically, communicatively, and/or operatively). In some examples, communication channels 76 may include a system bus, a network connection, an inter-process communication data structure, or any other method for communicating data.

One or more communication units 72 of recommendation server system 60 may communicate with external computing devices, such as computing device 10, by transmitting and/or receiving network signals on one or more networks, such as network 30. For example, recommendation server system 60 may use communication unit 72 to transmit and/or receive radio signals via link 32E to exchange information with computing device 10 and/or media output device 8. Examples of communication unit 72 include a network interface card (e.g. such as an Ethernet card), an optical transceiver, a radio frequency transceiver, a GPS receiver, or any other type of device that can send and/or receive information. Other examples of communication units 72 may include short wave radios, cellular data radios, wireless Ethernet network radios, as well as universal serial bus (USB) controllers.

One or more storage devices 74 within recommendation server system 60 may store information for processing during operation of recommendation server system 60 (e.g., recommendation server system 60 may store data accessed by modules 62, 64, and 66 during execution at recommendation server system 60). In some examples, storage devices 74 are a temporary memory, meaning that a primary purpose of storage devices 74 is not long-term storage. Storage devices 74 on recommendation server system 60 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 74, in some examples, also include one or more computer-readable storage media. Storage devices 74 may be configured to store larger amounts of information than volatile memory. Storage devices 74 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 74 may store program instructions and/or data associated with modules 62, 64, and 66.

One or more processors 70 may implement functionality and/or execute instructions within recommendation server system 60. For example, processors 70 on recommendation server system 60 may receive and execute instructions stored by storage devices 74 that execute the functionality of modules 62, 64, and 66. These instructions executed by processors 70 may cause recommendation server system 60 to store information, within storage devices 74 during program execution. Processors 70 may execute instructions of modules 62, 64, and 66 to provide media content recommendations to one or more computing devices (e.g., computing device 10 of FIG. 1). That is, modules 62, 64, and 66 may be operable by processors 70 to perform various actions or functions of recommendation server system 60.

Data stores 68 represent any suitable storage medium for storing user profile information (e.g., user preferences for interacting with devices 8, 10, and/or 12, location histories including information for use in determining a content-viewing location of the user, communications including e-mail, text-messages, voice/video mails, contact lists, social media profiles, etc.) and rules (e.g., of a machine learning system) for discerning a proximity of a computing device to other computing devices. For example, device proximity rules data store 68A may store one or more rules of a machine learning algorithm or other prediction system used by device context module 62 in determining whether a mobile computing device (e.g., computing device 10) is in proximity to a media output device (e.g., media output device 8) while the computing device is located at a content-viewing location (e.g., content-viewing location 2). User profile information data store 68B may include information about a user of a computing device, such as computing device 10, that device context module 62 and recommendation module 66 access to determine, respectively, a context of a computing device and one or more media recommendations for the user of the computing device.

In operation, recommendation module 66 may determine whether or not to cause notification host module 64 to provide one or more media recommendations to a user of computing device 10 at a time at which recommendation module 66 determines that the user is more likely to be interested in watching media content. Recommendation module 66 may determine, based on a location history associated with mobile computing device 10, a content-viewing location associated with the user. For instance, device context module 62 may infer that a repeated occurrence of a residential address associated with a user corresponds to a home location of the user, or that a repeated occurrence of a commercial address corresponds to a work location of the user, or that a repeated occurrence of a restaurant or bar corresponds to a restaurant or bar location associated with the user. Device context module 62 may determine, based on a location history of media output device 8 stored at user profile information data store 68B, that media output device 8 is most often located at a single location. Recommendation module 66 may determine that the typical location of media output device 8 and the home location of the user correspond to the same location and infer that the home location associated with the user is a content-viewing location of the user.

At a current time, device context module 62 may determine that computing device 10 and media output device 8 are collocated at the same content-viewing location associated with the user and that devices 8 and 10 are in proximity to each other. For example, recommendation module 66 may determine that a context of computing device 10 and a context of media output device 8 indicate that the two devices 8 and 10 are within a threshold distance of each other (e.g., at the same street address, same block, etc.). Recommendation module 66 may communicate with media output device 8 and obtain information indicating whether media output device 8 is operating in an on state at a current time, an indication of whether media output device 8 is outputting media content for display at a current time, an indication of the type of media content being output by media output device 8 at the current time, etc. Recommendation module 66 may receive an indication of a strength of a signal (e.g., a Bluetooth signal) received by media output device 8 from computing device 10.

Recommendation module 66 may input the information obtained from media output device 8 into one or more rules stored are device proximity rules data store 68A for determining whether a user of computing device 10, when proximate to media output device 8, is likely viewing media content. For example, recommendation module 66 may determine that the likelihood that the user is viewing media content exceeds a probability threshold when strength of a Wi-Fi signal (e.g., a Bluetooth signal) being communicated between computing device 10 and media output device 8 is high (e.g., greater than a decibel per meter threshold).

After determining that the user of computing device 10 is likely viewing media content at the current time, media recommendation module 66 may ascertain one or more media recommendations for the user. For example, if recommendation module 66 receives information from media output device 8 indicating a particular VOD services being accessed by media output device 8 at a current time, recommendation module 66 may determine one or more programs available from the particular VOD service that match a user profile maintained at user profile information data store 68B and accessed by recommendation module 66.

In any event, recommendation module 66 may send graphical information to notification host module 64 for causing notification host module 64 to output an indication (e.g., notification data) to mobile computing device 10 that includes information specifying the one or more media recommendations determined at the current time. Notification client module 22 may cause UI module 20 to present the notification data as a graphical, audible, or haptic type alert to indicate to the user that the one or more media recommendations were received.

In some examples, recommendation server system 60 may obtain, from media server system 80, information associated with one or more media content services. The one or more media recommendations determined by recommendation module 66 may be determined based on media content specified by the information associated with the one or more media content services and obtained from the media server. In other words, recommendation module 66 may communicate with media server system 80 via communication unit 72 and its connection with network 30. Recommendation module 66 may query VOD service module 82 for videos, shows, programs, etc. that are available at the current time and correspond to one or more user interests stored at user profile information data stores 68B. For example, if the profile information associated with the user indicates that the user likes action sports, VOD service module 82 may provide titles, times, channels, etc. or identifying information associated with one or more action-sports programs available at the current time, and from the particular VOD service that media output device 8 is currently streaming content from.

Recommendation module 66 may query TV service module 84 for content, shows, programs, etc. that are available at the current time and correspond to one or more user interests stored at user profile information data stores 68B. For example, if the profile information associated with the user indicates that the user likes action sports, TV service module 84 may provide titles, times, channels, etc. or identifying information associated with one or more action-sports programs available at the current time, and from a TV service associated with the user when media output device 8 is currently not outputting or otherwise streaming content.

In some examples, recommendation server system 60 may, responsive to determining that media output device 8 is outputting media content for display at the current time, determine that the media content is associated with one or more video-on-demand services, and determine, based on the one or more video-on-demand services, the one or more media recommendations. In other words, recommendation module 66 may provide as an input to a machine learning algorithm, information obtained from device 8 that indicates that device 8 is outputting media content from a particular VOD service. Recommendation module 66 may infer that because computing device 10 is in proximity to device 8 when device 8 is streaming VOD content that a user of computing device 10 may wish to view one or more media recommendation associated with that particular VOD service.

In some examples, recommendation module 66 may identify, from metadata associated with the media content being output for display at the current time, a particular video-on-demand service from the one or more video-on-demand services, determine, based on the particular video-on-demand service, the one or more media recommendations. For instance, recommendation module 66 may have access to a video stream received by device 8 as device 8 outputs graphical content associated with the video stream to display device 12. The video stream information may include meta data specifying an origin or source of the video stream. Recommendation module 66 may determine that the meta data indicates that the media content is being provided by a particular VOD media service executing at media server system 80 and provide recommendations based on the various movies, programs, or shows offered by that particular VOD media service.

In some examples, recommendation server system 60 may, responsive to determining that media output device 8 is operating in the on state and refraining from outputting media content for display at the current time, determine that the media content is associated with one or more television services, and determine, based on the one or more television services, the one or more media recommendations. For example, recommendation module 66 may obtain date or other information via network 30 indicating an operating state of media output device 8 (e.g., whether media output device 8 is operating in standby or "off-mode" and not outputting graphical content for display at display device 12, operating in a "on-mode" and processing VOD media content from media server system 80 and outputting the processed VOD media content for display at display device 12, etc.). If the operating state of media output device 8 indicates that media output device 8 is not processing media content and causing display device 12 to present audible sounds or graphical images/video based on the media content, then recommendation module 66 may infer that a user of computing device 10, in proximity to media output device 8 at content-viewing location 2, is watching television (e.g., a cable television broadcast, an over-the-air television broadcast, a satellite television broadcast, etc.). Recommendation module 66 may tailor the media recommendations provided to mobile computing device 10 at the current time to be media recommendations for watching television shows or programs available from media server system 80 that match television preferences contained at user profile information data store 68B.

In some examples, recommendation server system 60 may determine a strength of a communication signal received at media output device 8 and from mobile computing device 10, and responsive to determining that the strength of the communication signal satisfies a threshold, determine that the mobile computing device 10 is located at content-viewing location 2 and in proximity to media output device 8 at a current time. For example, device context module 62 of recommendation server system 60 may determine when computing device 10 is in proximity to media output device 8 (e.g., when respective locations of devices 8 and 10 are within a distance threshold of one or more meters) and the user of computing device 10 at a content-viewing location ((e.g., content-viewing location 2, for instance, a room or area of a house, office, building, bar/restaurant, or other location at which the user views media content). Device context module 62 may alert recommendation module 66 when mobile computing device 10 is in proximity to media output device 8, at content viewing location 2, to cause recommendation module 66 to provide media recommendations to the user at a particular time.

Device context module 62 may determine that a user of computing device 10 is viewing media being output for display by media output device 8 when device context module 62 receives an indication from media output device 8 that computing device 10 and media output device 8 are in a short range communication session (e.g., Bluetooth). For instance, device context module 62 may determine a device identifier (e.g., a user name, a phone number, etc.) associated with one or more short range wireless communication signals received by media output device 8 and perform a lookup of the device identifier within profile information associated with the user of computing device 10 to determine whether media output device 8 and computing device 10 are exchanging data. Device context module 62 may interpret a strength of a communication signal between devices 8 and 10 and if the strength exceeds a threshold, infer that the two devices 8 and 10 are close enough to indicate that a user of mobile computing device 10 may be watching media content being output, for display, by media output device 8.

In some examples, recommendation server system 60 may responsive to determining that media output device 8 is receiving, at the current time, media content from mobile computing device 10, determine, based on individual preferences associated with the user of mobile computing device 10, the one or more media recommendations. For instance, media output device 8 may be configurable by mobile computing device 10 to "mirror" graphical content being output for display by device 10 by processing the formatting the graphical content being displayed by device 10 and causing device 12 to present the graphical content for display. In other words, media output device 8 may relay graphical content from mobile computing device 10 to a screen of display device 12, such that mobile computing device 10 does not have to communicate directly with device 12 to cause device 12 to present graphical content. Rather, device 10 may communicate directly with media output device 8 and media output device 8 may cause device 12 to mirror a screen of device 10 and present graphical content being output by device 10.

In any event, recommendation module 66 may obtain information from media output device 8 that indicates when media output device is being controlled by mobile computing device 10 and relaying graphical content being output for display by device 10. Recommendation module 66 may infer that when device 10 is controlling media output device 8 and causing device 8 to mirror a screen of device 10 that a user of device 10 is currently viewing, and in control of the, media content being shown at content-viewing location 2. Recommendation module 66 may tailor media recommendations for computing device 10 to be recommendations based on the individual preferences of the user of computing device 10, or in other words, the individual preferences of the user of the computing device that is currently in control of media output device 8, at the current time and not some other user preferences.

In some examples, recommendation server system 60 may, responsive to determining that media output device 8 is receiving, at the current time, media content from at least one computing device other than mobile computing device 10, determining, by the computing system, based on group preferences associated with the user of mobile computing device, the one or more media recommendations. For instance, as indicated above, media output device 8 may be configurable by mobile computing device 10 to "mirror" graphical content being output for display by device 10 by processing the formatting the graphical content being displayed by device 10 and causing device 12 to present the graphical content for display. Recommendation module 66 may obtain information from media output device 8 that indicates when media output device is being controlled by a computing device other than mobile computing device 10 and relaying graphical content being output for display by the other device. For instance, the user of computing device 10 may be at content-viewing location 2 along with a friend, a spouse, a co-worker, etc. A mobile computing device associated with the friend, spouse, co-worker, etc. may be controlling media output device 8 and/or causing media output device 8 to output graphical content for display. Recommendation module 66 may infer that when computing device 10 and the user of computing device 10 are not in control of media output device 8 at the current time, tailored media recommendations based on a group preference, rather than individual preference, associated with the user may be more appropriate at the current time. Recommendation module 66 may determine an identifier of the user of the other device and determine one or more media recommendations that overlap between preferences of the user of computing device 10 and the user of the other device stored at user profile information data store 68B.

In this way, recommendation server system 60 may provide one or more media recommendations to the user of mobile computing device 10 when the user is likely viewing media content and provide media recommendations that are better suited to the tastes, preferences, or likes and dislikes of the user and/or groups that the user is associated with. By providing timely media recommendations when the user is more likely watching a television broadcast or a VOD service, and of the type of recommendation that fits with the user profile information of the user, the user of computing device 10 may perceive the recommendations as being useful rather than an annoyance. Useful media recommendations provided by recommendation server system 60 may have a better chance at gaining the attention of the user of computing device 10 and as a result, the media content specified by the media recommendations may have a better chance at being viewed. Without any user intervention (e.g., without user input) the user may receive recommendations and accordingly, spend less time searching for media content to watch with mobile computing device 10, media output device 8, and display device 12.

Figure 3:
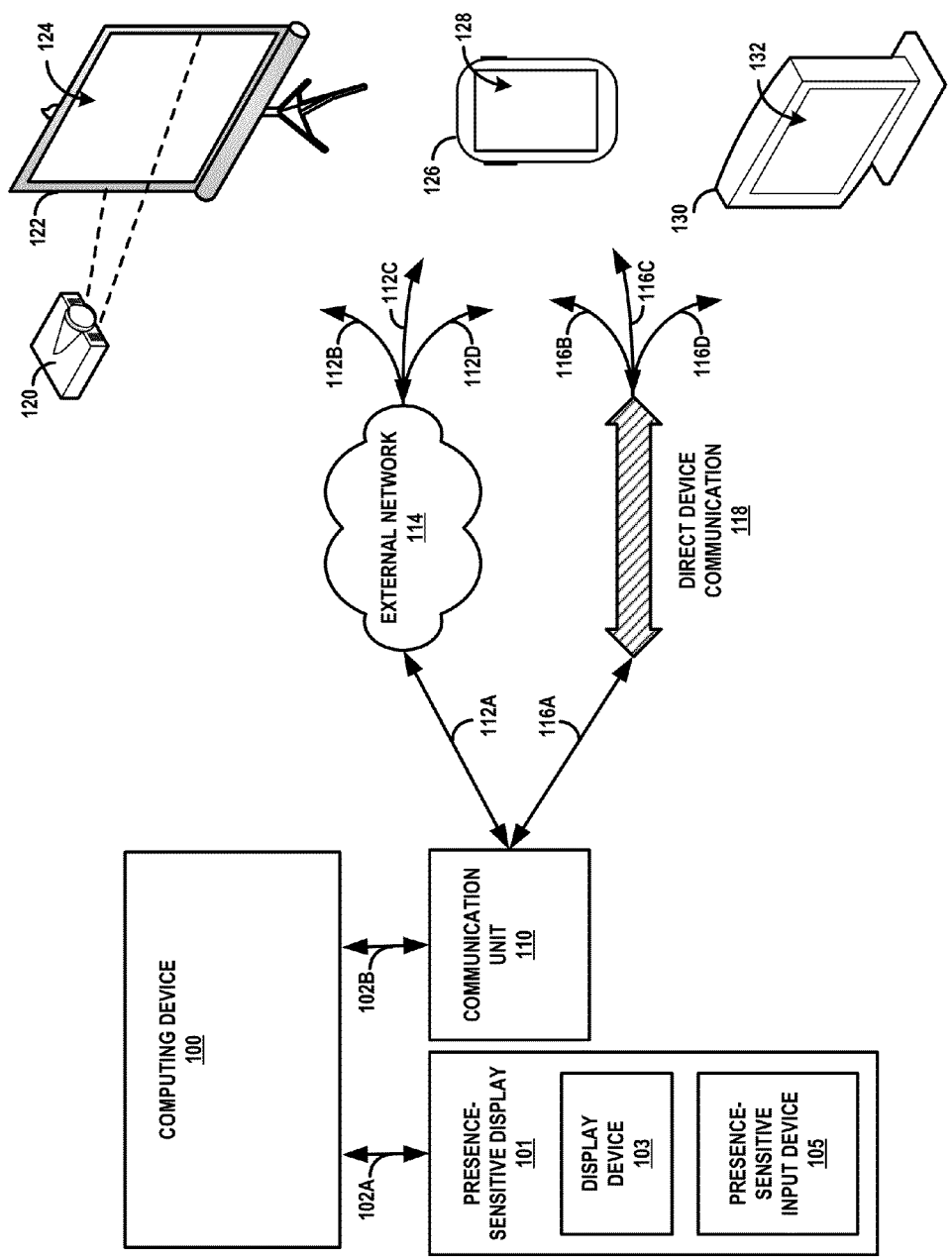
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 100, presence-sensitive display 101, communication unit 110, projector 120, projector screen 122, mobile device 126, and visual display device 130. Although shown for purposes of example in FIG. 1 as multiple stand-alone computing devices 10, a computing device such as one of computing devices 10, and computing device 100 may, generally, be any component or system that includes a processor or other suitable computing environment for executing software instructions and, for example, need not include a presence-sensitive display.

As shown in the example of FIG. 3, computing device 100 may be a processor that includes functionality as described with respect to processors 70 in FIG. 2. In such examples, computing device 100 may be operatively coupled to presence-sensitive display 101 by a communication channel 102A, which may be a system bus or other suitable connection. Computing device 100 may also be operatively coupled to communication unit 110, further described below, by a communication channel 102B, which may also be a system bus or other suitable connection. Although shown separately as an example in FIG. 3, computing device 100 may be operatively coupled to presence-sensitive display 101 and communication unit 110 by any number of one or more communication channels.

In other examples, such as illustrated previously by computing devices 10 in FIG. 1, a computing device may refer to a portable or mobile device such as mobile phones (including smart phones), laptop computers, computing watches, computing eye glasses, wearable computing devices, etc. In some examples, a computing device may be a desktop computers, tablet computers, smart television platforms, cameras, personal digital assistants (PDAs), servers, mainframes, etc.

Presence-sensitive display 101 may include display device 103 and presence-sensitive input device 105. Display device 103 may, for example, receive data from computing device 100 and display the graphical content. In some examples, presence-sensitive input device 105 may determine one or more inputs (e.g., continuous gestures, multi-touch gestures, single-touch gestures, etc.) at presence-sensitive display 101 using capacitive, inductive, and/or optical recognition techniques and send indications of such input to computing device 100 using communication channel 102A. In some examples, presence-sensitive input device 105 may be physically positioned on top of display device 103 such that, when a user positions an input unit over a graphical element displayed by display device 103, the location at which presence-sensitive input device 105 corresponds to the location of display device 103 at which the graphical element is displayed. In other examples, presence-sensitive input device 105 may be positioned physically apart from display device 103, and locations of presence-sensitive input device 105 may correspond to locations of display device 103, such that input can be made at presence-sensitive input device 105 for interacting with graphical elements displayed at corresponding locations of display device 103.

As shown in FIG. 3, computing device 100 may also include and/or be operatively coupled with communication unit 110. Examples of communication unit 110 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 100 may also include and/or be operatively coupled with one or more other devices, e.g., input devices, output devices, memory, storage devices, etc. that are not shown in FIG. 3 for purposes of brevity and illustration.

FIG. 3 also illustrates a projector 120 and projector screen 122. Other such examples of projection devices may include electronic whiteboards, holographic display devices, heads up display (HUD) and any other suitable devices for displaying graphical content. Projector 120 and projector screen 122 may include one or more communication units that enable the respective devices to communicate with computing device 100. In some examples, the one or more communication units may enable communication between projector 120 and projector screen 122. Projector 120 may receive data from computing device 100 that includes graphical content. Projector 120, in response to receiving the data, may project the graphical content onto projector screen 122. In some examples, projector 120 may determine one or more inputs (e.g., continuous gestures, multi-touch gestures, single-touch gestures, etc.) at projector screen 122 using optical recognition or other suitable techniques and send indications of such input using one or more communication units to computing device 100. In such examples, projector screen 122 may be unnecessary, and projector 120 may project graphical content on any suitable medium and detect one or more user inputs using optical recognition or other such suitable techniques.

Projector screen 122, in some examples, may include a presence-sensitive display 124. Presence-sensitive display 124 may include a subset of functionality or all of the functionality of UI device 4 as described in this disclosure. In some examples, presence-sensitive display 124 may include additional functionality. Projector screen 122 (e.g., an electronic display of computing eye glasses), may receive data from computing device 100 and display the graphical content. In some examples, presence-sensitive display 124 may determine one or more inputs (e.g., continuous gestures, multi-touch gestures, single-touch gestures, etc.) at projector screen 122 using capacitive, inductive, and/or optical recognition techniques and send indications of such input using one or more communication units to computing device 100.

FIG. 3 also illustrates mobile device 126 and visual display device 130. Mobile device 126 and visual display device 130 may each include computing and connectivity capabilities. Examples of mobile device 126 may include e-reader devices, convertible notebook devices, hybrid slate devices, computerized watches, computerized eyeglasses, etc. Examples of visual display device 130 may include other semi-stationary devices such as televisions, computer monitors, automobile displays, etc. As shown in FIG. 3, mobile device 126 may include a presence-sensitive display 128. Visual display device 130 may include a presence-sensitive display 132. Presence-sensitive displays 128, 132 may include a subset of functionality or all of the functionality of display device 12 as described in this disclosure. In some examples, presence-sensitive displays 128, 132 may include additional functionality. In any case, presence-sensitive display 132, for example, may receive data from computing device 100 and display the graphical content. In some examples, presence-sensitive display 132 may determine one or more inputs (e.g., continuous gestures, multi-touch gestures, single-touch gestures, etc.) at projector screen using capacitive, inductive, and/or optical recognition techniques and send indications of such input using one or more communication units to computing device 100.

As described above, in some examples, computing device 100 may output graphical content for display at presence-sensitive display 101 that is coupled to computing device 100 by a system bus or other suitable communication channel. Computing device 100 may also output graphical content for display at one or more remote devices, such as projector 120, projector screen 122, mobile device 126, and visual display device 130. For instance, computing device 100 may execute one or more instructions to generate and/or modify graphical content in accordance with techniques of the present disclosure. Computing device 100 may output the data that includes the graphical content to a communication unit of computing device 100, such as communication unit 110. Communication unit 110 may send the data to one or more of the remote devices, such as projector 120, projector screen 122, mobile device 126, and/or visual display device 130. In this way, computing device 100 may output the graphical content for display at one or more of the remote devices. In some examples, one or more of the remote devices may output the graphical content at a presence-sensitive display that is included in and/or operatively coupled to the respective remote devices.

In some examples, computing device 100 may not output graphical content at presence-sensitive display 101 that is operatively coupled to computing device 100. In other examples, computing device 100 may output graphical content for display at both a presence-sensitive display 101 that is coupled to computing device 100 by communication channel 102A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 100 and output for display at presence-sensitive display 101 may be different than graphical content display output for display at one or more remote devices.

Computing device 100 may send and receive data using any suitable communication techniques. For example, computing device 100 may be operatively coupled to external network 114 using network link 112A. Each of the remote devices illustrated in FIG. 3 may be operatively coupled to network external network 114 by one of respective network links 112B, 112C, and 112D. External network 114 may include network hubs, network switches, network routers, etc., that are operatively inter-coupled thereby providing for the exchange of information between computing device 100 and the remote devices illustrated in FIG. 3. In some examples, network links 112A-112D may be Ethernet, ATM or other network connections. Such connections may be wireless and/or wired connections.

In some examples, computing device 100 may be operatively coupled to one or more of the remote devices included in FIG. 3 using direct device communication 118. Direct device communication 118 may include communications through which computing device 100 sends and receives data directly with a remote device, using wired or wireless communication. That is, in some examples of direct device communication 118, data sent by computing device 100 may not be forwarded by one or more additional devices before being received at the remote device, and vice-versa. Examples of direct device communication 118 may include Bluetooth, Near-Field Communication, Universal Serial Bus, Wi-Fi, infrared, etc. One or more of the remote devices illustrated in FIG. 3 may be operatively coupled with computing device 100 by communication links 116A-116D. In some examples, communication links 112A-112D may be connections using Bluetooth, Near-Field Communication, Universal Serial Bus, infrared, etc. Such connections may be wireless and/or wired connections.

In accordance with techniques of the disclosure, computing device 100 may be operatively coupled to visual display device 130 using external network 114. Responsive to outputting a device identifier associated with computing device 100 to a media output device such as media output device 8 of FIGS. 1 and 2, computing device 100 may receive, from a computing system such as recommendation server system 60 of FIGS. 1 and 2, an indication (e.g., data) of one or more media recommendations for the user at the current time. The one or more media recommendations may be based on a plurality of features associated with the media output device, including, but not limited to, an indication of whether the media output device is operating in an on state at the current time and an indication of whether the media output device is outputting media content for display at the current time.

Responsive to receiving the indication of the one or more media recommendations, computing device 100 may output a graphical indication (e.g., a graphical user interface, etc.) that includes information based on the one or more media recommendations (e.g., show schedules, titles, graphics, etc.). For examples, computing device 100 may output, for display, the graphical indication based on the media recommendations data to visual display device 130. Computing device 100 may output, for display, the graphical indication via direct device communication 118 or external network 114 to display device 130. In some examples, display device 130 outputs the graphical indication for display to the user associated with computing device 100 and the user may, in turn, interact with computing device 100 by selecting or dismissing some or all of the displayed graphical indication.

Figure 4:
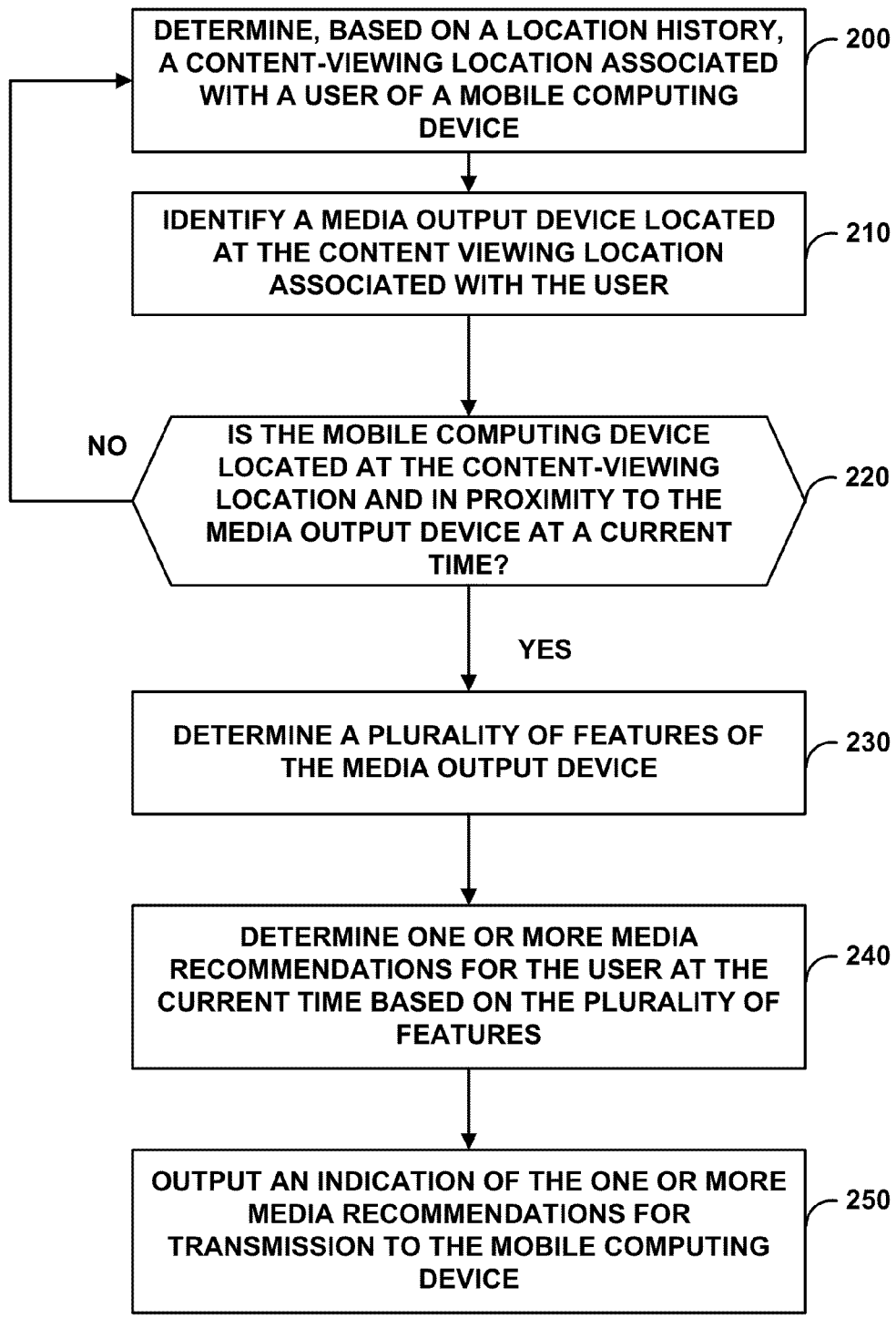
FIG. 4 is a flowchart illustrating example operations of an example computing system configured to output one or more media recommendations to a mobile computing device, in accordance with one or more aspects of the present disclosure.

FIG. 4 is a flowchart illustrating example operations of an example computing system configured to output one or more media recommendations to a mobile computing device, in accordance with one or more aspects of the present disclosure. Operations 200-250 of FIG. 4 are described below within the context of system 1 of FIG. 1 and recommendation server system 60 of FIG. 2. For example, modules 62, 64, and 66 of recommendation server system 60 may be operable by at least one of processors 70 to perform operations 200-250 of FIG. 4.

In operation, recommendation server system 60 may determine, based on a location history, content-viewing location 2 associated with a user of mobile computing device 10 (200). For example, device context module 62 may infer a home location of a user of mobile computing device 10 corresponding to content-viewing location 2, based on a repeated occurrence of a location of a residential address appearing in a location history of the user during a particular period time of day. Device context module 62 may determine that, based on a location history of media output device 8, that media output device 8 is most often located at the home location of the user (e.g., content-viewing location 2) and as such, the location of media output device 8, at the home of the user, corresponds to a content-viewing location.

Recommendation server system 60 may identify a media output device located at the content-viewing location associated with the user (210) and whether mobile computing device 10 is located at content-viewing location 2 and in proximity to media output device 8 at the current time (220). For example, device context module 62 of recommendation server system 60 may determine a signal strength of a Bluetooth signal exchanged between devices 8 and 10 and if a strong signal (e.g., greater than a threshold decibel per meter value), device context module 62 may determine that devices 8 and 10 are collocated an in proximity to each other.

After determining that mobile computing device 10 is located at content-viewing location 2 and in proximity to media output device 8 at the current time, recommendation server system 60 may determine a plurality of features of media output device 8 (230). For example, recommendation server system 60 may determine whether media output device 8 is operating in a powered-on state and whether media output device 8 is outputting media content for display.

Recommendation server system 60 may determine one or more media recommendations for the user at the current time based on the plurality of features (240). For example, recommendation module 66 may determine one or more television type media recommendations after inferring that a user of computing device 10 is watching television since media output device 8 is powered-on and refraining from outputting VOD media content. Conversely, recommendation module 66 may determine one or more VOD service type media recommendations after inferring that the user is watching a VOD service since media output device 8 is powered-on and outputting VOD media content for display.

Recommendation server system 60 may output an indication of the one or more media recommendations for transmission to mobile computing device 10 (250). For example, recommendation module 66 may transfer an indication (e.g., data) containing information relate to the one or more media recommendations to notification host module 64 for causing notification host module 64 for outputting notification data including the one or more media recommendations as an e-mail, text-message, instance message, etc. to mobile computing device 10. A user of mobile computing device 10 may be alerted by mobile computing device 10 to the receipt of the notification of the one or more media recommendations and may view information associated with the recommendations at a display (e.g., display device 12). For example, the notification data may include information regarding at least one recommendation for a television show being broadcast at the current time, at least one recommendation for a video that is available from a video-on-demand service at the current time, or at least one recommendation for a television channel that is available from a television service at the current time.

In some examples recommendation server system 60 may obtain one or more communications associated with the user of mobile computing device 10, and determine the one or more media recommendations based on information contained within the communications associated with the user. The one or more communications may include at least one of calendar communication, an e-mail communication, a text-messaging communication, or a social media communication. In other words, user profile information at a store 68B may contain communication information and/or portions of e-mails, text-messages, instant messages, voice-mails, etc. that refer to media content, preferences, user interests, etc. Recommendation module 66 may base the one or more recommendations on the user preferences that are based on the one or more communications.

In some examples recommendation server system 60 may output the indication of the one or more media recommendations by at least outputting, for transmission to mobile computing device 10, a command to configure mobile computing device 10 to generate a notification for alerting the user of mobile computing device 10 to the receipt of the one or more media recommendations. Said differently, recommendation module 66 may cause notification host module 64 to configure/command mobile computing device 10 to output a notification for which to alert the user of computing device 10 as to the generation and receipt of the one or more media recommendations.

In some examples recommendation server system 60 may responsive to determining that mobile computing device 10 is located at the content-viewing location and not in proximity to media output device 8 at the current time, refrain from outputting, for transmission to mobile computing device 10, the indication of the one or more media recommendations. In other words, despite determining that computing device 10 is at content-viewing location 2, if recommendation server system 60 detects that media output device 8 is not located at content-viewing location 2, recommendation module 66 may infer that the user of computing device 10 probably does not wish to receive media recommendations since without media output device 8, the user is likely not watching media content. As a result, recommendation module 66 may refrain from generating media recommendations.

In some examples recommendation server system 60 may responsive to determining that mobile computing device 10 is in proximity to a second media output device that is not located at the content-viewing location associated with the user, refrain from outputting, for transmission to mobile computing device 10, the indication of the one or more media recommendations. In other words, recommendation module 66 may predict that when the user is at a location which is not one of his or her content-viewing locations based on location history, that the user probably does not have control, or wish to control any media output devices located at the location. As a result, recommendation module 66 may refrain from generating media recommendations.

Figure 5:
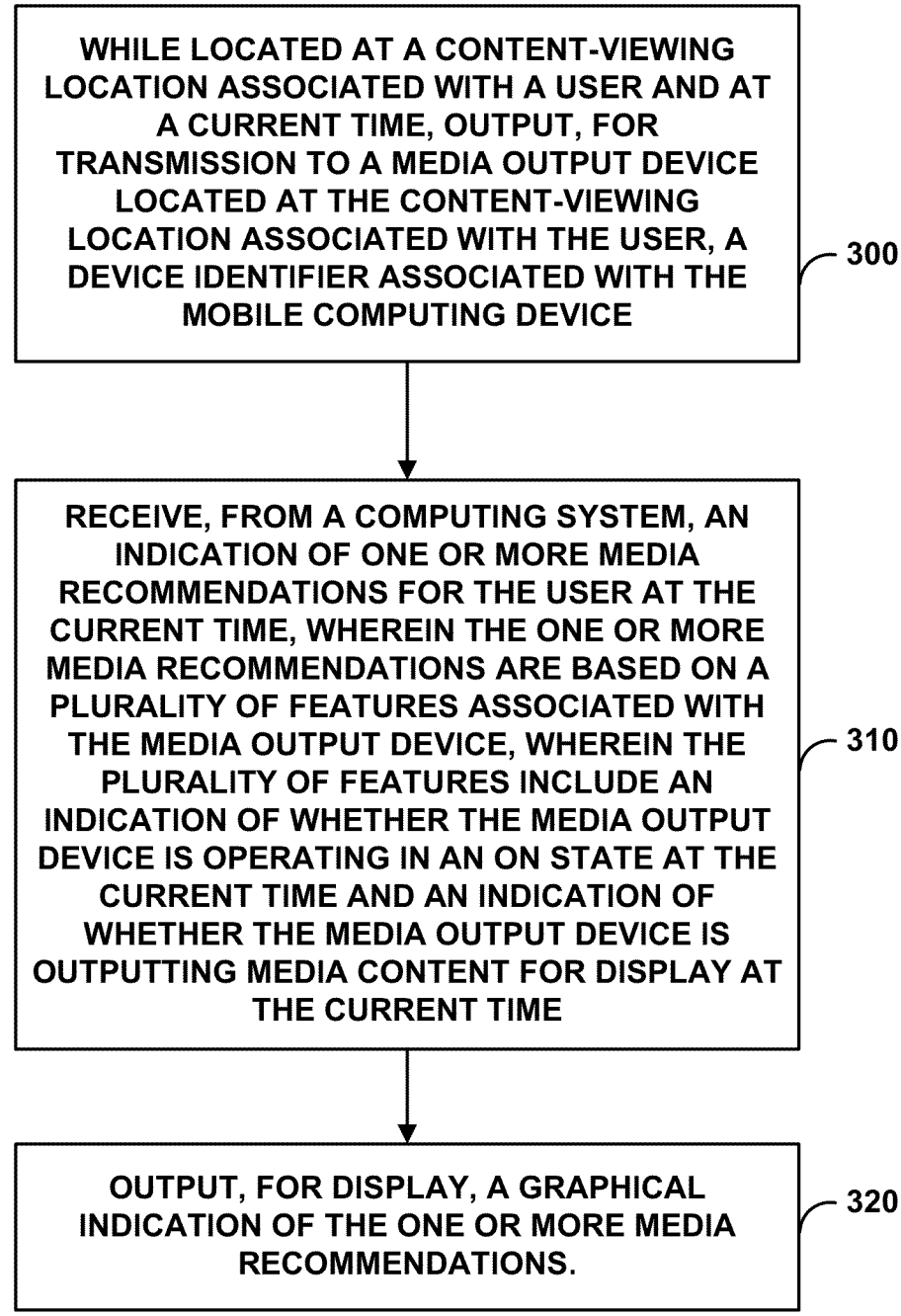
FIG. 5 is a flowchart illustrating example operations of an example mobile computing device configured to output a graphical indication of one or more media recommendations received from an example computing system, in accordance with one or more aspects of the present disclosure.

FIG. 5 is a flowchart illustrating example operations of an example mobile computing device configured to output a graphical indication of one or more media recommendations received from an example computing system, in accordance with one or more aspects of the present disclosure. Operations 300-320 of FIG. 5 are described below within the context of system 1 of FIG. 1. For example, modules 20, 22, and 24A of mobile computing device 10 may be operable by at least one of processor of mobile computing device 10 to perform operations 300-320 of FIG. 5.

In operation, mobile computing device 10, while located at content-viewing location 2 associated with a user and at a current time, may output, for transmission to media output device 8 located at content-viewing location 2 associated with the user, a device identifier associated with mobile computing device (300). For example, computing device 10 may establish a Bluetooth communication session with media output device 8 while devices 8 and 10 are collocated at content-viewing location 2. The device identifier output by device 10 to device 8 may identify computing device 10.

Responsive to outputting the device identifier associated with mobile computing device 10, mobile computing device 10 may receive, from recommendation server system 60, an indication of one or more media recommendations for the user at the current time. The one or more media recommendations may be based on a plurality of features associated with media output device 8 including: an indication of whether media output device 8 is operating in an on state at the current time and an indication of whether media output device 8 is outputting media content for display at the current time (310). For example, responsive to determining that media output device 8 and mobile computing device 10 are in communication, and that mobile computing device 10 is located at content-viewing location 2 at a current time, recommendation server system 60 may determine, and output for transmission to computing device 10, notification data including an indication of one or more media recommendation.

Mobile computing device 10 may output, for display, a graphical indication of the one or more media recommendations (320). For example, notification client module 22 may receive the notification data from recommendation server system 60 being transmitted across network 30. Notification host module 22 may send UI module 20 graphical content and a command to cause UI module 20 to present the one or more media recommendations for display at a screen of mobile computing device 10.

In some examples, the one or more media recommendations received from recommendation server system 60 are further based on a strength of a communication signal carrying the device identifier (e.g., a strength of the Bluetooth communication signal between devices 8 and 10). In some examples, mobile computing device 10 may output, for transmission to media output device 8, media content to be presented by the media content device. Recommendation server system 60 may determine the one or more media recommendations it provides to computing device 10 based on individual preferences associated with the user of the mobile computing device when the mobile computing devices outputs the media content to be presented by media content device 8. In other words, the media recommendations may be based on the user's individual preferences when recommendation server system infers that the user and mobile computing device 10 are in control of media output device 8.

In some examples, mobile computing device 10 may refrain from outputting, =for transmission to media output device 8, media content to be presented by media content device 8. The one or more media recommendations provided by recommendation server system 60 may be based on group preferences associated with the user of mobile computing device 10 when mobile computing devices 10 refrains from outputting the media content to be presented by media content device 8. In other words, the media recommendations may be based on the user's group preferences when recommendation server system infers that the user and mobile computing device 10 are not in control of media output device 8.

In some examples, mobile computing device 10 may receive, from recommendations server system 60, a command for configuring mobile computing device 10 to generate a notification for alerting the user of mobile computing device 10 to the receipt of the one or more media recommendations. The graphical indication of the one or more media recommendations may be output, for display, in response to receiving the command. In other words, notification client module 22 may receive notification data that contains information regarding the one or more media recommendations generated by recommendation server system 60. Notification client module 22 may cause UI module 20 to output a notification type alert (e.g., a sound, a LED flash, a graphical banner output, etc.) to indicate to the user of mobile computing device 10 that the one or more media recommendations were received.

In this way, a computing system, such as that described herein, may provide timely media recommendations to a user of a mobile computing device. The media recommendations may be provided at just the right time, when the computing system determines that the user is at a content viewing location of the user, and possibly, watching media content. The media recommendations may be tailored to a user's preferences, and or the current type of media being watched by the user at the current time. In this way, the user may seemingly, not have to manually search for television and/or VOD programming that would be of interest to the user when the user wants to watch media content.

Clause 1. A method comprising: determining, by a computing system and based on a location history associated with a user of a mobile computing device, a content-viewing location associated with the user; identifying, by the computing system, a media output device located at the content-viewing location associated with the user of the mobile computing device; and responsive to determining that the mobile computing device is located at the content-viewing location and in proximity to the media output device at a current time: determining, by the computing system, based on a plurality of features of the media output device, one or more media recommendations for the user at the current time, wherein the plurality of features include an indication of whether the media output device is operating in an on state at the current time; and outputting, by the computing system, for transmission to the mobile computing device, an indication of the one or more media recommendations.

Clause 2. The method of clause 1, further comprising obtaining, by the computing system, from a media server, information associated with one or more media content services, wherein the one or more media recommendations are determined based on media content specified by the information associated with the one or more media content services and obtained from the media server.

Clause 3. The method of any of clauses 1-2, wherein the plurality of features include an indication of whether the media output device is outputting media content for display at the current time, the method further comprising: responsive to determining that the media output device is outputting media content for display at the current time, determining, by the computing system, that the media content is associated with one or more video-on-demand services; and determining, by the computing system, based on the one or more video-on-demand services, the one or more media recommendations.

Clause 4. The method of clause 3, further comprising: identifying, by the computing system, from metadata associated with the media content being output for display at the current time, a particular video-on-demand service from the one or more video-on-demand services; and determining, by the computing system, based on the particular video-on-demand service, the one or more media recommendations.

Clause 5. The method of any of clauses 1-4, wherein the plurality of features include an indication of whether the media output device is outputting media content for display at the current time, the method further comprising: responsive to determining that the media output device is operating in the on state and refraining from outputting media content for display at the current time, determining, by the computing system, that the media content is associated with one or more television services; and determining, by the computing system, based on the one or more television services, the one or more media recommendations.

Clause 6. The method of any of clauses 1-5, further comprising: determining, by the computing device, a strength of a communication signal received at the media output device and from the mobile computing device; and responsive to determining that the strength of the communication signal satisfies a threshold, determining, by the computing system, that the mobile computing device is located at the content-viewing location and in proximity to the media output device at a current time.

Clause 7. The method of any of clauses 1-6, further comprising: responsive to determining that the media output device is receiving, at the current time, media content from the mobile computing device, determining, by the computing system, based on individual preferences associated with the user of the mobile computing device, the one or more media recommendations.

Clause 8. The method of any of clauses 1-7, further comprising: responsive to determining that the media output device is receiving, at the current time, media content from at least one computing device other than the mobile computing device, determining, by the computing system, based on group preferences associated with the user of the mobile computing device, the one or more media recommendations.

Clause 9. A computing system comprising: at least one processor; and at least one module operable by the at least one processor to: determine, based on a location history associated with a user of a mobile computing device, a content-viewing location associated with the user; identify a media output device located at the content-viewing location associated with the user of the mobile computing device; and responsive to determining that the mobile computing device is located at the content-viewing location and in proximity to the media output device at a current time: determine, based on a plurality of features of the media output device, one or more media recommendations for the user at the current time, wherein the plurality of features include an indication of whether the media output device is operating in an on state at the current time and an indication of whether the media output device is outputting media content for display at the current time; and output, for transmission to the mobile computing device, an indication of the one or more media recommendations.

Clause 10. The computing system of clause 9, wherein the one or more media recommendations comprise: at least one recommendation for a television show being broadcast at the current time, at least one recommendation for a video that is available from a video-on-demand service at the current time, or at least one recommendation for a television channel that is available from a television service at the current time.

Clause 11. The computing system of any of clauses 9-10, wherein the at least one module is further operable by the at least one processor to: obtain one or more communications associated with the user of the mobile computing device, the one or more communications comprising at least one of calendar communication, an e-mail communication, a text-messaging communication, or a social media communication, and wherein the at least one module is further operable by the at least one processor to determine the one or more media recommendations based on information contained within the communications associated with the user.

Clause 12. The computing system of any of clauses 9-11, wherein the at least one module is further operable by the at least one processor to output the indication of the one or more media recommendations by at least outputting, for transmission to the mobile computing device, a command to configure the mobile computing device to generate a notification for alerting the user of the mobile computing device to the receipt of the one or more media recommendations.

Clause 13. The computing system of any of clauses 9-12, wherein the at least one module is further operable by the at least one processor to: responsive to determining that the mobile computing device is located at the content-viewing location and not in proximity to the media output device at the current time, refrain from outputting, for transmission to the mobile computing device, the indication of the one or more media recommendations.

Clause 14. The computing system of any of clauses 9-13, wherein the media output device is a first media output device, wherein the at least one module is further operable by the at least one processor to: responsive to determining that the mobile computing device is in proximity to a second media output device that is not located at the content-viewing location associated with the user, refrain from outputting, for transmission to the mobile computing device, the indication of the one or more media recommendations.

Clause 15. The computing system of any of clauses 9-14, wherein the at least one module is further operable by the at least one processor to: responsive to determining that the media output device is receiving, at the current time, media content from the mobile computing device, determine, based on individual preferences associated with the user of the mobile computing device, the one or more media recommendations.

Clause 16. A method comprising: while located at a content-viewing location associated with a user and at a current time, outputting, by a mobile computing device, for transmission to a media output device located at the content-viewing location associated with the user, a device identifier associated with the mobile computing device; responsive to outputting the device identifier associated with the mobile computing device, receiving, by the mobile computing device, from a computing system, an indication of one or more media recommendations for the user at the current time, wherein the one or more media recommendations are based on a plurality of features associated with the media output device, wherein the plurality of features include an indication of whether the media output device is operating in an on state at the current time and an indication of whether the media output device is outputting media content for display at the current time; and outputting, by the mobile computing device, for display, a graphical indication of the one or more media recommendations.

Clause 17. The method of clause 16, wherein the one or more media recommendations are further based on a strength of a communication signal carrying the device identifier.

Clause 18. The method of any of clauses 16-17, further comprising: outputting, by the mobile computing device, for transmission to the media output device, media content to be presented by the media content device, wherein the one or more media recommendations are further based on individual preferences associated with the user of the mobile computing device when the mobile computing devices outputs the media content to be presented by the media content device.

Clause 19. The method of any of clauses 16-18, further comprising: refraining from outputting, by the mobile computing device, for transmission to the media output device, media content to be presented by the media content device, wherein the one or more media recommendations are further based on group preferences associated with the user of the mobile computing device when the mobile computing devices refrains from outputting the media content to be presented by the media content device.

Clause 20. The method of any of clauses 16-19, further comprising: receiving, by the mobile computing device, from the computing system, a command for configuring the mobile computing device to generate a notification for alerting the user of the mobile computing device to the receipt of the one or more media recommendations, wherein the graphical indication of the one or more media recommendations is output, for display, in response to receiving the command.

Clause 21. A computer-readable storage medium comprising instructions that, when executed by at least one processor of a computing system, are configured to perform any of the methods of clauses 1-8.

Clause 22. A computing system comprising means for performing any of the methods of clauses 1-8.

Clause 23. A computer-readable storage medium comprising instructions that, when executed by at least one processor of a computing device, are configured to perform any of the methods of clauses 16-20.

Clause 24. A computing device comprising means for performing any of the methods of clauses 16-20.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
    determining, by a computing system and based on a location history associated with a user of a mobile computing device, a content-viewing location associated with the user;
    identifying, by the computing system, a media output device located at the content-viewing location, wherein the media output device is associated with a display device, and the display device is configured to display media content provided by the media output device and one or more television services; and
    responsive to determining that the mobile computing device is located at the content-viewing location and in proximity to the media output device at a current time:
        determining, by the computing system, based on a plurality of features of the media output device, one or more media recommendations for the user at the current time, wherein the plurality of features include an indication of whether the media output device is operating in an on state at the current time and an indication of whether the media output device is either outputting the media content for display at the display device at the current time or refraining from outputting the media content for display at the display device at the current time; and
        outputting, by the computing system, for transmission to the mobile computing device, an indication of the one or more media recommendations.

2. The method of claim 1, further comprising:
    obtaining, by the computing system, from a media server, information associated with one or more media content services, wherein the one or more media recommendations are determined based on media content specified by the information associated with the one or more media content services and obtained from the media server.

3. The method of claim 1, further comprising:
    responsive to determining that the media output device is outputting the media content for display at the display device at the current time, determining, by the computing system, that the media content is associated with one or more video-on-demand services; and
    determining, by the computing system, based on the one or more video-on-demand services, the one or more media recommendations.

4. The method of claim 3, further comprising:
    identifying, by the computing system, from metadata associated with the media content being output for display at the display device at the current time, a particular video-on-demand service from the one or more video-on-demand services; and
    determining, by the computing system, based on the particular video-on-demand service, the one or more media recommendations.

5. The method of claim 1, further comprising:
    responsive to determining that the media output device is operating in the on state and refraining from outputting the media content for display at the display device at the current time, determining, by the computing system, that the one or more television services are outputting the media content for display at the display device at the current time; and
    determining, by the computing system, based on the one or more television services, the one or more media recommendations.

6. The method of claim 1, further comprising:
    determining, by the computing device, a strength of a communication signal received at the media output device and from the mobile computing device; and
    responsive to determining that the strength of the communication signal satisfies a threshold, determining, by the computing system, that the mobile computing device is located at the content-viewing location and in proximity to the media output device at a current time.

7. The method of claim 1, further comprising responsive to determining that the media output device is receiving, at the current time, the media content from the mobile computing device, determining, by the computing system, based on individual preferences associated with the user of the mobile computing device, the one or more media recommendations.

8. The method of claim 1, further comprising responsive to determining that the media output device is receiving, at the current time, the media content from at least one computing device other than the mobile computing device, determining, by the computing system, based on group preferences associated with the user of the mobile computing device, the one or more media recommendations.

9. A computing system comprising:
    at least one processor; and
    at least one module operable by the at least one processor to:
        determine, based on a location history associated with a user of a mobile computing device, a content-viewing location associated with the user;
        identify a media output device located at the content-viewing location associated with the user, wherein the media output device is associated with a display device, and the display device is configured to display media content provided by the media output device and one or more television services; and
        responsive to determining that the mobile computing device is located at the content-viewing location and in proximity to the media output device at a current time:
            determine, based on a plurality of features of the media output device, one or more media recommendations for the user at the current time, wherein the plurality of features include an indication of whether the media output device is operating in an on state at the current time and an indication of whether the media output device is either outputting media content for display at the display device at the current time or refraining from outputting the media content for display at the display device at the current time; and
            output, for transmission to the mobile computing device, an indication of the one or more media recommendations.

10. The computing system of claim 9, wherein the one or more media recommendations comprise:
    at least one recommendation for a television show being broadcast from the one or more television services at the current time,
    at least one recommendation for a video that is available from a video-on-demand service accessible from the media output device at the current time, or
    at least one recommendation for a television channel that is available from the one or more television services at the current time.

11. The computing system of claim 9, wherein the at least one module is further operable by the at least one processor to obtain one or more communications associated with the user of the mobile computing device, the one or more communications comprising at least one of calendar communication, an e-mail communication, a text-messaging communication, or a social media communication, and wherein the at least one module is further operable by the at least one processor to determine the one or more media recommendations based on information contained within the communications associated with the user.

12. The computing system of claim 9, wherein the at least one module is further operable by the at least one processor to output the indication of the one or more media recommendations by at least outputting, for transmission to the mobile computing device, a command to configure the mobile computing device to generate a notification for alerting the user of the mobile computing device to the receipt of the one or more media recommendations.

13. The computing system of claim 9, wherein the at least one module is further operable by the at least one processor to responsive to determining that the mobile computing device is located at the content-viewing location and not in proximity to the media output device at the current time, refrain from outputting, for transmission to the mobile computing device, the indication of the one or more media recommendations.

14. The computing system of claim 9, wherein:
the media output device is a first media output device, and
the at least one module is further operable by the at least one processor to responsive to determining that the mobile computing device is in proximity to a second media output device that is not located at the content-viewing location associated with the user, refrain from outputting, for transmission to the mobile computing device, the indication of the one or more media recommendations.

15. The computing system of claim 9, wherein the at least one module is further operable by the at least one processor to responsive to determining that the media output device is receiving, at the current time, the media content from the mobile computing device, determine, based on individual preferences associated with the user of the mobile computing device, the one or more media recommendations.

16. A method comprising:
while located at a content-viewing location associated with a user and at a current time, outputting, by a mobile computing device, for transmission to a media output device located at the content-viewing location associated with the user, a device identifier associated with the mobile computing device, wherein the media output device is associated with a display device, and the display device is configured to display media content provided by the media output device and one or more television services;

responsive to outputting the device identifier associated with the mobile computing device, receiving, by the mobile computing device, from a computing system, an indication of one or more media recommendations for the user at the current time, wherein the one or more media recommendations are based on a plurality of features associated with the media output device, wherein the plurality of features include an indication of whether the media output device is operating in an on state at the current time and an indication of whether the media output device is either outputting media content for display at the display device at the current time or refraining from outputting the media content for display at the display device at the current time; and outputting, by the mobile computing device, for display, a graphical indication of the one or more media recommendations.

17. The method of claim 16, wherein the one or more media recommendations are further based on a strength of a communication signal carrying the device identifier.

18. The method of claim 16, further comprising outputting, by the mobile computing device, for transmission to the media output device, the media content to be outputted by the media output device for display at the display device, wherein the one or more media recommendations are further based on individual preferences associated with the user of the mobile computing device when the mobile computing devices outputs the media content to be outputted by the media device for display at the display device.

19. The method of claim 16, further comprising refraining from outputting, by the mobile computing device, for transmission to the media output device, the media content to be outputted by the media output device for display at the display device, wherein the one or more media recommendations are further based on group preferences associated with the user of the mobile computing device when the mobile computing devices refrains from outputting the media content to be outputted by the media content device for display at the display device.

20. The method of claim 16, further comprising receiving, by the mobile computing device, from the computing system, a command for configuring the mobile computing device to generate a notification for alerting the user of the mobile computing device to the receipt of the one or more media recommendations, wherein the graphical indication of the one or more media recommendations is output, for display, in response to receiving the command.

\* \* \* \* \*